Oct. 9, 1928.　　　　　　　　　　　　　　　1,686,533
A. G. RONNING ET AL
CONVEYER
Filed July 12, 1926　　　2 Sheets-Sheet 1
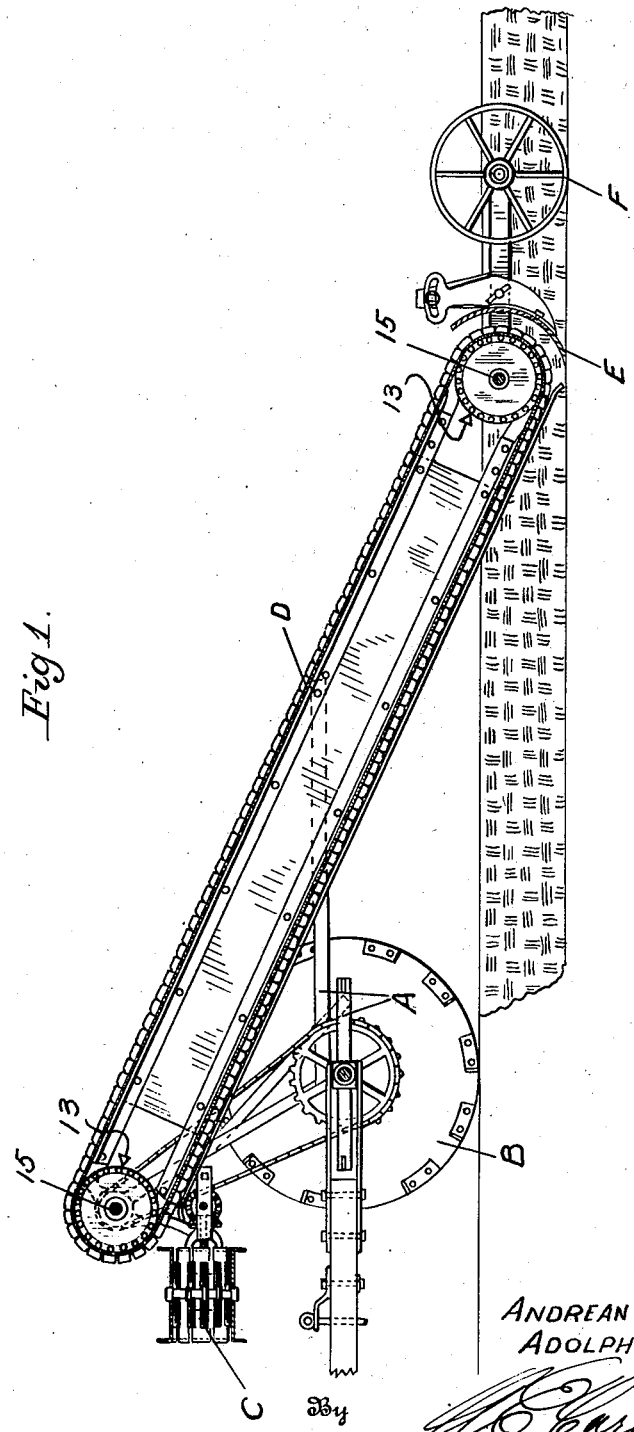

Oct. 9, 1928.  
A. G. RONNING ET AL  
1,686,533  
CONVEYER  
Filed July 12, 1926  2 Sheets-Sheet 2
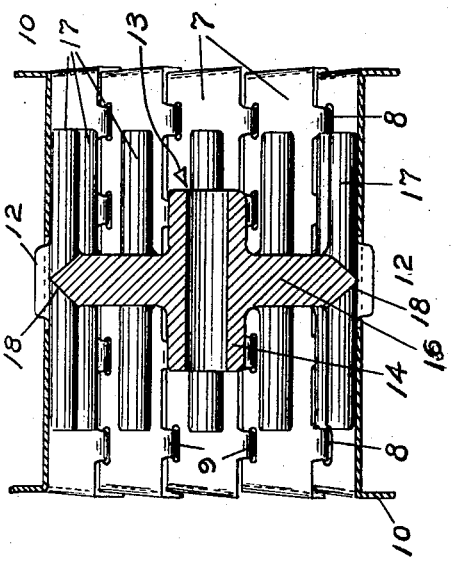
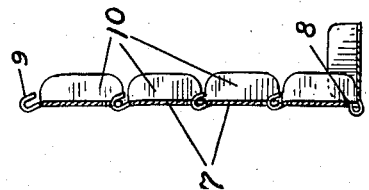
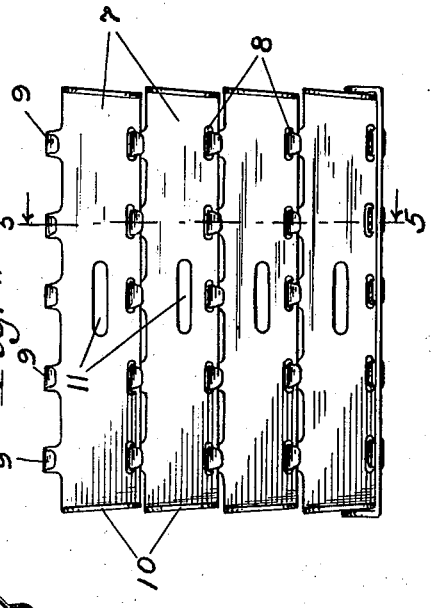
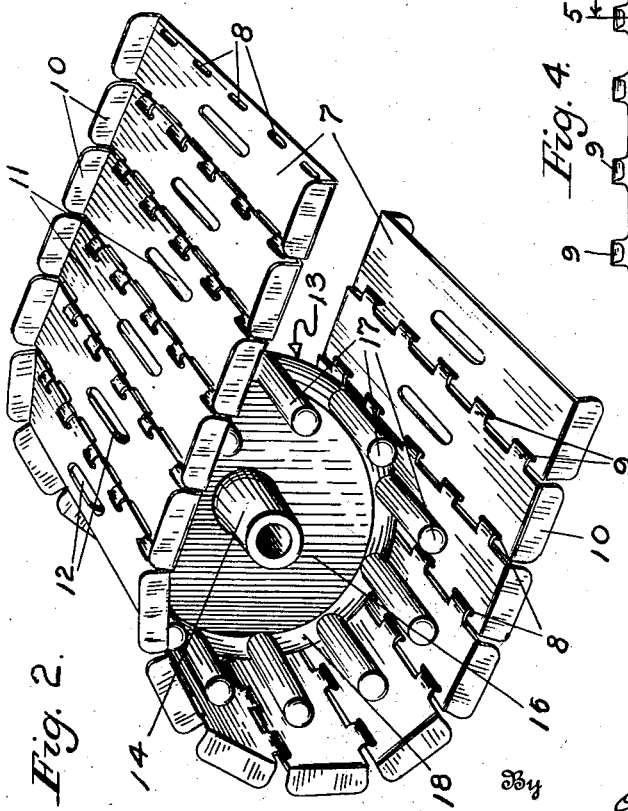
Inventor  
ANDREAN G. RONNING  
ADOLPH RONNING  
By  
Attorney Patented Oct. 9, 1928.

1,686,533

UNITED STATES PATENT OFFICE.

ANDREAN G. RONNING AND ADOLPH RONNING, OF MINNEAPOLIS, MINNESOTA; JACOB A. RONNING AND ADOLPH RONNING EXECUTORS OF SAID ANDREAN G. RONNING, DECEASED.

CONVEYER.

Application filed July 12, 1926. Serial No. 121,833.

This invention relates to conveying devices of the endless type and the main object is to provide an improved type of conveyer belt, and supports therefor, which is particular adapted for use in conveying dirt, crushed rock, and other substances or articles, from one place to another. Further and more specific objects will be disclosed in the course of the following specification, reference being had to the accompanying drawings, wherein:

Fig. 1 is a side elevation of a ditching machine, in which is embodied our invention, the machine shown being similar to the one shown in Fig. 1 of our Patent No. 1,501,621, issued July 15th, 1924, for ditching machine, except that many of the parts thereof, not concerned with the present invention, are omitted.

Fig. 2 is an enlarged, detail perspective view of one end of the conveyer belt and its supporting spool or roller.

Fig. 3 is a transverse sectional elevation through the roller and belt as shown in Fig. 2.

Fig. 4 is a plan view of a portion of our improved conveyer belt.

Fig. 5 is a sectional elevation on the line 5—5 in Fig. 4.

Referring to the drawings more particularly and by reference characters, A designates the frame of a ditching machine, having front supporting wheels B, a transverse conveyer C, an inclined conveyer D, for delivering dirt from the bottom of the ditch to the conveyer C, a shovel E for digging the dirt and passing it to the conveyer D, and a supporting wheel F near the lower end of the inclined conveyer boom. These parts are all shown and fully described in our above mentioned Patent No. 1,501,621, and will therefore not here be set forth in detail, as the only object of showing the machine in Fig. 1 is to illustrate a practical application of the present invention.

Each of the conveyers C and D is made up of an endless belt passing over a pair of reels or spools at its ends. The belt and spool construction is clearly illustrated in Figs. 2 to 5, inclusive, and may be described as follows:

The belt or apron is made up of an endless series of linked sections, each of which consists of a plate 7, having holes 8 punched near one edge to receive bent-up integral hooks or fingers 9 of the opposite edge of the adjacent section. These fingers not only very effectively connect the plates but also keep the holes or perforations 8 clean, as they move with respect thereto as the plates advance over and leave the spools which support and drive the conveyer. It may also be noted that the hooks 9 project outwardly, so that they cannot be accidentally dis-engaged, and that they can only be intentionally disengaged when the belt has been shortened so that two of the plates may be turned to right angles, with respect to each other, as indicated at the bottom of Figs. 4 and 5.

Each plate is also provided with angular, integral extensionse 10 at its outer ends, their objects being, primarily, to re-inforce the section and to serve as side walls to retain the carried load on the belt. It may be noted that the extensions 10 on each side of the belt, are not in the same plane, but are angled slightly or staggered with respect to each other, the object being to permit any two sections to be angled for purpose of hooking or unhooking (as in Fig. 5). The plates 7 are also provided with central elongated slots 11 which are engaged by lugs 12, carried by the reels or end spools 13.

Each of the spools or rollers 13 consists of a hub 14, carried on a shaft 15, and a centrally disposed web 16 which is integral with the hub. At the periphery of the web is a series of parallel, spaced bars 17, which are integral with the web, and each carries one of the lugs 12 which engage the conveyer sections as above mentioned. The bars 17 are long enough to form a substantial support for the belt, but are spaced from each other so that any dirt or material falling through the openings in the belt will not be wedged in between the belt and spool, but will drop between the bars to the circular opening formed by them. Likewise, the spool 13 is provided with the one central web, and not two or more webs, so that such loose dirt or material falling into the spool, will not jam between webs, but is unobstructed so as to readily pass endwise away from the interior of the spool or roller. And with the same object in mind the periphery of the web, between the bars 17, is tapered, as indicated at 18.

It is understood that suitable modifications may be made in the general design and structural details of the invention as herein shown and described, provided, however, that said modifications come within the spirit and scope of the appended claims. Having now therefore fully shown and described our invention, what we claim to be new and desire to protect by Letters Patent is:

1. A conveyer belt comprising a series of sections arranged substantially edge to edge and each having means at one edge for interlocking engagement with the adjacent edge portion of the adjoining section, each section having integrally formed end extensions, and the ends of said extensions being offset from the ends of the adjacent extensions whereby the belt may be inwardly turned to permit the sections to be locked and unlocked.

2. A conveyer comprising an endless belt formed of a series of rigid, interlocked sections, spools over which the belt is run, each of said spools being open at its ends, and having peripherally spaced bar supports adapted to support the belt as the latter passes thereover and adapted to respectively engage the belt sections at points intermediate their advancing and rear edges.

3. A conveyer comprising an endless belt, spools over which the belt is run, each of said spools being open at its ends, and having periphally spaced bar supports adapted to transversely engage the belt as the latter passes thereover, and lugs carried by the spool for positively engaging the belt so as to either drive or be driven by the same.

4. A conveyer comprising a belt having an endless series of interlocked sections, a spool, for supporting one end of the belt, and having a plurality of spaced, peripherally arranged bars adapted to successively engage the belt sections at points intermediate the advancing and rear edges of the sections.

5. A conveyer comprising a belt having an endless series of interlocked sections, a spool, for supporting one end of the belt, and having a plurality of spaced, peripherally arranged bars adapted to successively engage the belt sections at points intermediate the advancing and rear edges of the sections, said belt sections having recesses at said points for operatively receiving portions of the spool.

6. A conveyer comprising a belt having an endless series of interlocked sections, a spool, for supporting one end of the belt, and having a plurality of spaced bars adapted to successively engage the belt sections at points intermediate the advancing and rear edges of the sections, said belt sections having recesses at said points and said spool having lug members adjacent said bars for engaging the recesses, whereby power may be transmitted positively from the spool to the belt.

In testimony whereof we affix our signatures.

ANDREAN G. RONNING.
ADOLPH RONNING.